United States Patent
Matsuoka et al.

(10) Patent No.: US 10,035,456 B2
(45) Date of Patent: Jul. 31, 2018

(54) VEHICLE CONTROL APPARATUS

(71) Applicant: TOYOTA JIDOSHA KABUSHIKI KAISHA, Toyota-shi, Aichi (JP)

(72) Inventors: Katsuhiro Matsuoka, Nagakute (JP); Kazuhiro Morimoto, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/242,873

(22) Filed: Aug. 22, 2016

(65) Prior Publication Data
US 2017/0080859 A1 Mar. 23, 2017

(30) Foreign Application Priority Data

Sep. 18, 2015 (JP) .................... 2015-186043

(51) Int. Cl.
| | |
|---|---|
| *G08G 1/09* | (2006.01) |
| *B60Q 9/00* | (2006.01) |
| *G08G 1/0967* | (2006.01) |
| *G08G 1/16* | (2006.01) |
| *B60W 30/09* | (2012.01) |
| *G08G 1/01* | (2006.01) |

(52) U.S. Cl.
CPC ............ *B60Q 9/008* (2013.01); *B60W 30/09* (2013.01); *G08G 1/0112* (2013.01); *G08G 1/0116* (2013.01); *G08G 1/0133* (2013.01); *G08G 1/0141* (2013.01); *G08G 1/096716* (2013.01); *G08G 1/096758* (2013.01); *G08G 1/096783* (2013.01); *G08G 1/096791* (2013.01); *G08G 1/163* (2013.01); *G08G 1/166* (2013.01)

(58) Field of Classification Search
CPC .. B60Q 9/008; G08G 1/096716; G08G 1/166; G08G 1/096791; G08G 1/096783
USPC ..... 340/905, 435, 436, 439, 576, 903; 701/5, 701/70, 99, 36, 113, 22, 48, 101, 110
See application file for complete search history.

(56) References Cited

U.S. PATENT DOCUMENTS

2015/0375745 A1* 12/2015 Yaguchi ............... B60W 50/10 701/70

FOREIGN PATENT DOCUMENTS

| JP | 2008-198162 A | 8/2008 | |
|---|---|---|---|
| WO | WO 2014122724 A1 * | 8/2014 | ......... B60W 30/188 |

* cited by examiner

Primary Examiner — Dhaval Patel
(74) Attorney, Agent, or Firm — Oliff PLC

(57) ABSTRACT

The invention relates to a vehicle control apparatus configured to perform a first particular situation informing for providing information depending on a first particular situation regarding a vehicle traveling where a driver of a vehicle should be alerted and the vehicle should continue to be stopped when determining that a first particular situation occurs and perform a simultaneous operation informing for providing information depending on a simultaneous operation situation where both of an acceleration operator and a brake operator of the vehicle are operated when determining that the simultaneous operation situation occurs. The vehicle control apparatus is configured to perform the first particular situation informing without performing the simultaneous operation informing when determining that both of the first particular situation and the simultaneous operation situation occur.

4 Claims, 6 Drawing Sheets

VEHICLE CONTROL APPARATUS

BACKGROUND OF THE INVENTION

Field of the Invention

The present invention relates to a vehicle control apparatus having a function for performing an informing for alerting a driver of a vehicle on the basis of road situation information acquired from an outside of the vehicle through a wireless communication.

Description of the Related Art

Apparatuses for providing a driver of a vehicle with various alerting information regarding a driving of the vehicle have been developed.

For example, in countries such as Japan and United Kingdom which have a traffic regulation for regulating vehicles to keep to a left side of a road, when an own vehicle stops at an intersection in order to turn right and an oncoming vehicle which will travel straight through the intersection approaches the intersection, one of such apparatuses performs an informing for informing the driver of the own vehicle of an existence of the oncoming vehicle (for example, see JP 2008-198162 A).

SUMMARY OF THE INVENTION

It is beneficial to perform an informing for informing a driver of the vehicle of a situation where both of an operation of a brake pedal and an operation of an acceleration pedal are performed and prompting the driver to make necessary driving operations when both of the brake and acceleration operations are performed for some reason. Hereinafter, the operation of the brake pedal will be referred to as "the brake pedal operation", the operation of the acceleration pedal will be referred to as "the acceleration pedal operation" and the aforementioned informing will be referred to as "the simultaneous operation informing".

When both of a condition that a straight-traveling vehicle attention informing should be performed (hereinafter, this condition will be referred to as "the straight-traveling vehicle attention informing condition") and a condition that the simultaneous operation informing should be performed (hereinafter, this condition will be referred to as "the simultaneous operation informing condition") are satisfied and thus, the simultaneous operation informing is performed, the driver may once release the brake pedal and then, operate the brake pedal again in response to the simultaneous operation informing. In the case that the brake pedal is released with the acceleration pedal being operated, the vehicle may travel forward at the intersection even when the oncoming vehicle which may travel straight through the intersection approaches the intersection.

Further, when both of the straight-traveling vehicle attention informing and the simultaneous operation informing are performed, the driver directs his/her attention to the simultaneous operation informing and as a result, the driver may not realize the straight-traveling vehicle attention informing.

The present invention has been made for solving the above-described problem. An object of the present invention is to provide a vehicle control apparatus which can surely inform the driver of the vehicle of a particular situation regarding a vehicle traveling where the driver should be alerted while preventing the vehicle from traveling forward due to the performance of the simultaneous operation informing when the particular situation occurs.

A vehicle control apparatus according to the present invention (hereinafter, will be referred to as "the invention apparatus") comprises:

a road situation information acquisition device (70, 80, 81, 90, 91) configured to acquire road situation information on a road situation from an outside of a vehicle (10) through a wireless communication;

determination means (20) configured to determine whether or not a first particular situation regarding a vehicle traveling where a driver of the vehicle should be alerted and the vehicle should continue to be stopped occurs and determine whether or not a simultaneous operation situation where both of an acceleration operator (33) and a brake operator (44) of the vehicle (10) are operated occurs (steps 515, 530 and 560 of FIG. 5); and informing means (20, 25, 26) configured to perform a first particular situation informing for providing information depending on the first particular situation when the determination means (20) determines that the first particular situation occurs and perform a simultaneous operation informing for providing information depending on the simultaneous operation situation when the determination means (20) determines that the simultaneous operation situation occurs (steps 523, 543 and 565 of FIG. 5).

The first particular situation is a situation regarding the vehicle traveling where the driver of the vehicle (10) should be alerted and the vehicle (10) should continue to be stopped when the vehicle (10) is stopped at an intersection (101) in order to turn right.

The informing means (20, 25, 26) is configured to perform the first particular situation informing without performing the simultaneous operation informing when the determination means (20) determines that both of the first particular situation and the simultaneous operation situation occur (a determination of "Yes" at step 515 of FIG. 5 and steps 520 and 523).

Thereby, when the first particular situation occurs, the simultaneous operation informing is not performed and thus, the forward traveling of the vehicle by the driver's operation derived from the simultaneous operation informing is prevented. In addition, only the first particular situation informing is performed without the performing of the simultaneous operation informing and thus, the driver is unlikely to overlook the first particular situation informing.

The determination means (20) may be configured to determine whether or not a second particular situation regarding the vehicle traveling where the driver of the vehicle (10) should be alerted and the vehicle (10) is permitted to travel on the basis of the road situation information (step 525 of FIG. 5).

In this case, the informing means (20, 25, 26) may be configured to perform a second particular situation informing for providing information depending on the second particular situation when the determination means (20) determines that the first particular situation and the simultaneous operation situation do not occur and the second particular situation occurs (a determination of "Yes" at a step 525 of FIG. 5, a determination of "No" at a step 530 and a step 550). Furthermore, the informing means (20, 25, 26) may be configured to perform the simultaneous operation informing without performing the second particular situation informing when the determination means (20) determines that the first particular situation does not occur and the second particular situation and the simultaneous operation situation occur (a determination of "Yes" at the step 525, a determination of "Yes" at the step 530 and steps 540 and 543).

Thereby, the information on the simultaneous operation situation can be provided with the driver in preference to the information on the second particular situation where the driver should be alerted and the vehicle is permitted to travel forward.

In the above description, for facilitating understanding of the present invention, elements of the present invention corresponding to elements of an embodiment described later are denoted by reference symbols used in the description of the embodiment accompanied with parentheses. However, the elements of the present invention are not limited to the elements of the embodiment defined by the reference symbols. The other objects, features and accompanied advantages of the present invention can be easily understood from the description of the embodiment of the present invention along with the drawings.

DESCRIPTION OF THE PREFERRED EMBODIMENTS

Below, a vehicle control apparatus according to an embodiment of the invention will be described with reference to the drawings. Hereinafter, the vehicle control apparatus according to the embodiment will be referred to as "the embodiment apparatus".

Figure 1:
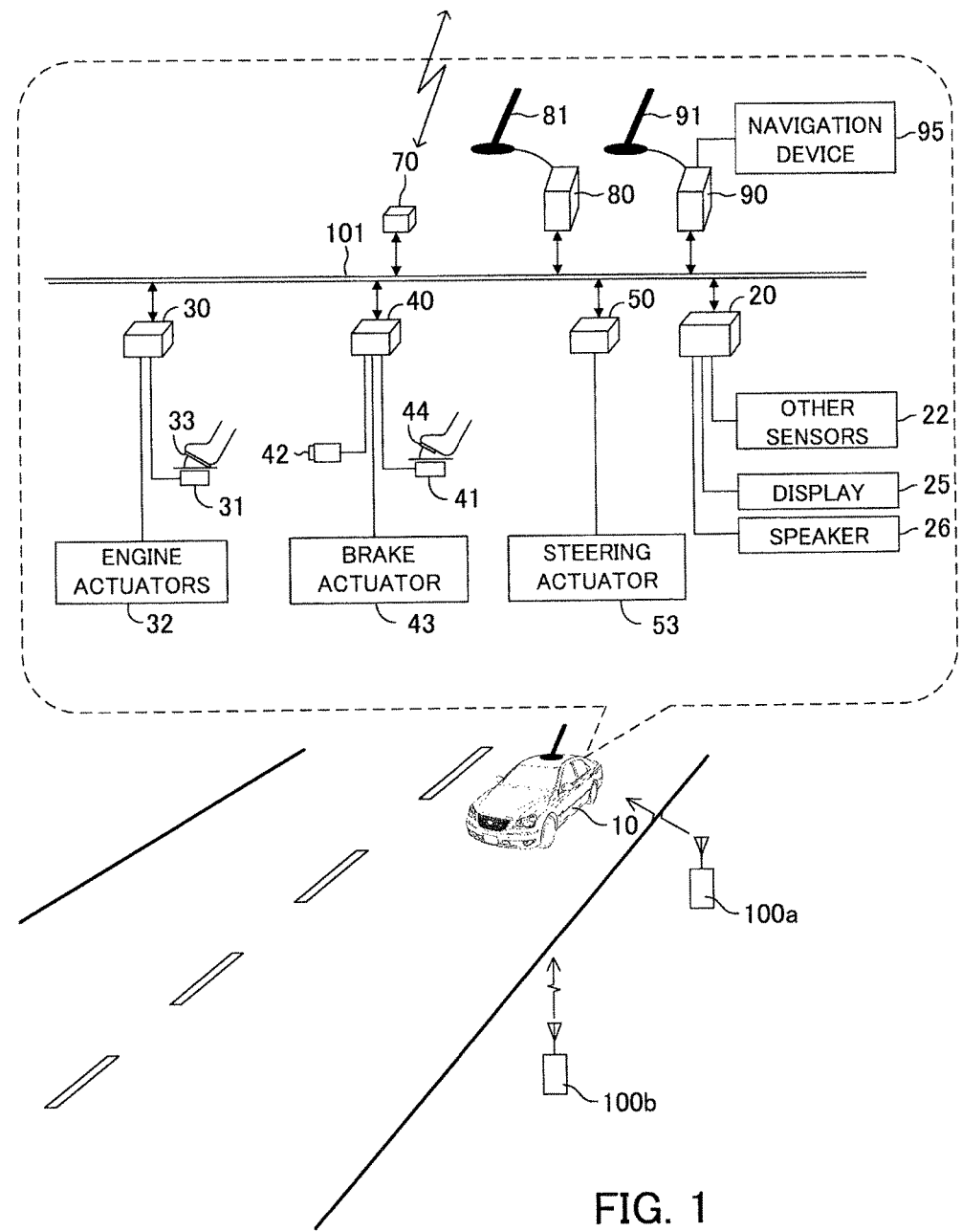
FIG. 1 is a general configuration view showing a vehicle control apparatus (hereinafter, will be referred to as "the embodiment apparatus") according to an embodiment of the present invention and a vehicle installed with the embodiment apparatus.

As shown in FIG. 1, the embodiment apparatus is applied to a vehicle (i.e., an own vehicle) 10. The embodiment apparatus comprises a vehicle control ECU 20, an engine control ECU 30, a brake control ECU 40, a steering control ECU 50, a GPS device 70, a wireless communication control ECU 80 and a navigation ECU 90.

The vehicle control ECU 20 is configured to exchange data or communicate with the engine ECU 30, the brake control ECU 40, the steering control ECU 50, the GPS device 70 and the wireless communication control ECU 80 via a communication/sensor system CAN (i.e., a communication/sensor system Controller Area Network) 101. Each of the ECU is an electric control unit including an electronic control circuit having a microcomputer as a main part. The microcomputer includes a CPU, a ROM, a RAM, an interface and the like. The CPU realizes various functions described later by executing instructions or programs stored in a memory (i.e., the ROM).

The vehicle control ECU 20 is electrically connected to sensors 22 other than sensors described later, a display 25 and a speaker 26. The display 25 is provided at a position that a driver of the own vehicle 10 can see when the driver drives the own vehicle 10. The display 25 displays a particular situation by graphic including characters, the particular situation relating to a vehicle traveling where the driver of the own vehicle 10 should be alerted. The display 25 is, for example, a combination meter which displays various meters or a head-up display which displays an image on a front windshield or a hybrid system indicator of a hybrid vehicle or the like.

The engine control ECU 30 is known. The engine control ECU 30 is electrically connected to sensors (not shown) for detecting various engine operation state amounts including an acceleration pedal operation amount sensor 31 and receives detection signals from these sensors.

The acceleration pedal operation amount sensor 31 detects an operation amount Accp of an acceleration pedal 33 as an acceleration operator and outputs a detection signal representing the amount Accp to the engine control ECU 30. Hereinafter, the amount Accp will be referred to as "the acceleration operation amount Accp".

Engine actuators 32 including a throttle valve actuator (not shown) and the like are electrically connected to the engine control ECU 30. The engine control ECU 30 is configured to drive the engine actuators 32 to change a torque generated by an internal combustion engine (not shown) of the own vehicle 10 such that an acceleration of the own vehicle 10 approaches an acceleration requested to the own vehicle 10 when the acceleration requested to the own vehicle 10 is a positive value, that is, when an acceleration is requested to the own vehicle 10.

The brake control ECU 40 is known. The brake control ECU 40 is electrically connected to sensors for detecting various vehicle operation state amounts including a brake pedal operation amount sensor 41 and a vehicle speed sensor 42 and acquires detection signals from the sensors.

The brake pedal operation amount sensor 41 detects an operation amount Brkp of a brake pedal 44 as a brake operator and outputs a detection signal representing the amount Brkp to the brake control ECU 40. Hereinafter, the amount Brkp will be referred to as "the brake pedal operation amount Brkp".

The vehicle speed sensor 42 detects a speed SPDj of the own vehicle 10 (hereinafter, this speed SPDj will be referred to as "the own vehicle speed SPDj") and outputs a detection signal representing the own vehicle speed SPDj. The brake control ECU 40 acquires the own vehicle speed SPDj of the own vehicle 10 on the basis of this detection signal and stores the acquired own vehicle speed SPDj in the RAM.

A brake actuator 43 such as a friction braking device (not shown) is electrically connected to the brake control ECU 40. The brake control ECU 40 is configured to drive the brake actuator 43 to generate friction braking forces at vehicle wheels of the own vehicle 10, respectively such that a deceleration of the own vehicle 10 approaches a requested acceleration (i.e., a requested deceleration) Gj when the requested acceleration Gj of the own vehicle 10 is a negative value, that is, when a deceleration is requested to the own vehicle 10.

The steering control ECU 50 is known. The steering control ECU 50 acquires detection signals from sensors (not shown) for detecting various vehicle operation state amounts. A steering actuator 53 such as a motor of an electric-powered steering device (not shown) is electrically connected to the steering control ECU 50.

The GPS device 70 is known. The GPS device 70 acquires a latitude and a longitude of a position where the own vehicle 10 travels on the basis of a GPS signal sent from an artificial satellite and stores the acquired latitude and longitude as data defining a position of the own vehicle 10 in the RAM.

The wireless communication control ECU 80 is electrically connected to a wireless antenna 81 for performing a wireless communication with roadside units provided at the side of a road.

The wireless communication control ECU 80 receives and acquires information on a vehicle traffic including information on a road situation (i.e., road situation information) sent from a radio wave roadside unit 100*a* via the wireless antenna 81 and stores the acquired information in the RAM. Concrete examples of this information will be described later with a description of the navigation ECU 90. Hereinafter, the information on the vehicle traffic sent from the radio wave roadside unit 100*a* will be referred to as "the infrastructure information".

The navigation ECU 90 is electrically connected to the wireless antenna 91 and the navigation device 95. The navigation ECU 90 receives and acquires the infrastructure information sent from an optical beacon roadside unit 100*b* via the wireless antenna 91 and stores the acquired infrastructure information in RAM.

The infrastructure information acquired by the navigation ECU 90 and the wireless communication control ECU 80 at least includes information A1 to A6 described with reference to FIGS. 2A and 2B.

(A1) Information on (1) oncoming vehicles 12*a* approaching a crossroad intersection 101 when the own vehicle 10*a* turns right at the crossroad intersection 101 and (2) pedestrians 13*a* and bicycles 13*b* around a traveling route of the own vehicle 10*a* which turns right, etc.

(A2) Information on pedestrians 13*c* and bicycles 13*d* around the traveling route of the own vehicle 10*b* which turns left at the crossroad intersection 101, etc.

(A3) Information on (1) present signal states such as a green signal state, a yellow signal state and a red signal state of traffic lights 101*a* to 101*d* around the own vehicle 10*a* or 10*b* and (2) lighting cycles of the traffic lights 101*a* to 101*d*, etc.

(A4) Information on (1) a lane, along which the other vehicles 12*c* and 12*d* travel around the own vehicle 10*c*, (2) positions of the other vehicles 12*c* and 12*d* and (3) vehicle speeds of the other vehicles 12*c* and 12*d*, etc.

(A5) Information on the pedestrians 13*a* and 13*c* and the bicycles 13*b* and 13*d* around the own vehicle 10*a* or 10*b*, i.e., pedestrian-and-bicycle information.

(A6) Information on (1) shapes of roads 102*a* to 102*g* around the own vehicle 10*a* or 10*b* or 10*c* or 10*d*, (2) a position of a momentary stop line 103 provided on a road 102*f* around the own vehicle 10*d* (see FIG. 2B), etc.

The navigation ECU 90 is configured or programmed to acquire own vehicle information including a position Pj of the own vehicle 10 (i.e., an own vehicle position Pj), a traveling direction 9 of the own vehicle 10 (i.e., an own vehicle traveling direction θ) and the like from the GPS device 70. As is known, the navigation ECU 90 is configured or programmed to display information on a traveling route to a destination and the like on the navigation device 95 on the basis of infrastructure information, a route information, an own vehicle information and the like.

<Summary of Particular Situation Informing Control>

Next, a summary of a particular situation informing control executed by the embodiment control apparatus will be described. When a situation regarding the vehicle traveling to be alerted to the driver of the own vehicle 10 (i.e., a particular situation) occurs, the vehicle control ECU 20 of the embodiment control apparatus informs the driver of the occurrence of the particular situation, using the display 25 and the speaker 26. Hereinafter, a control for informing the driver of the occurrence of the particular situation will be also referred to as "the particular situation informing".

In particular, the vehicle control ECU 20 acquires the infrastructure information from the wireless communication control ECU 80 and the navigation ECU 90 via the CAN 101, acquires the own vehicle position Pj from the GPS device 70 via the CAN 101 and acquires the own vehicle speed SPDj from the brake control ECU 40 via the CAN 101. The vehicle control ECU 20 determines whether or not at least one of following particular situations B1 to B7 occurs on the basis of the acquired information.

Figure 2A:
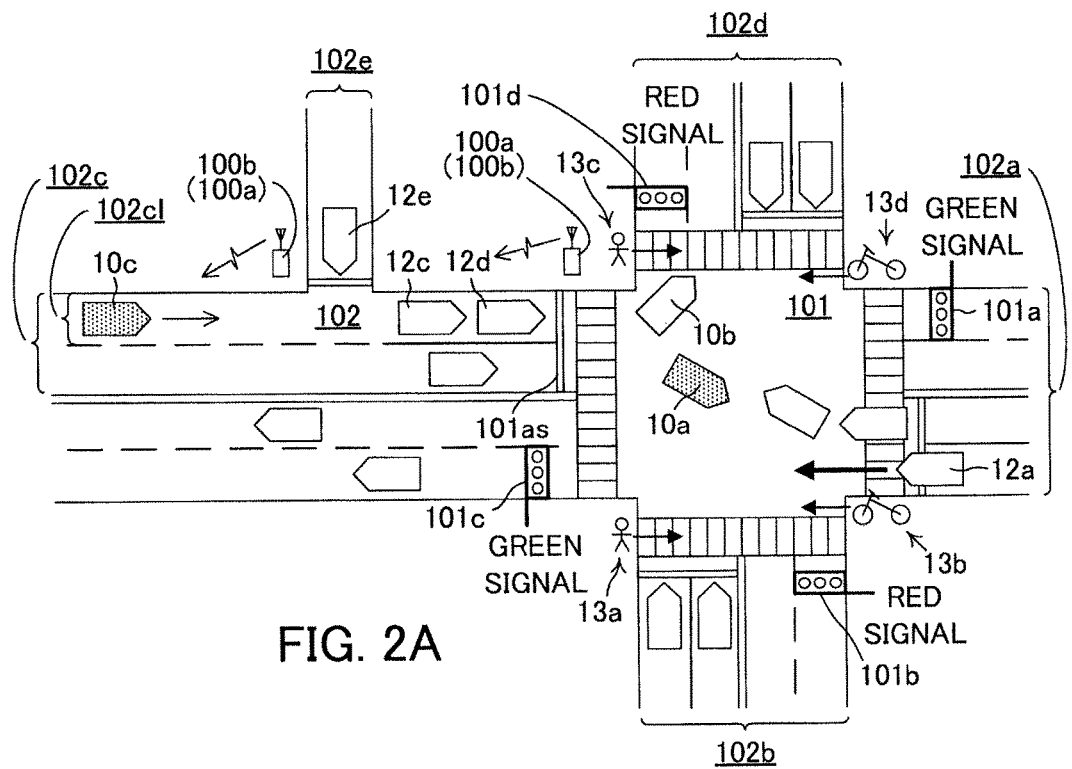
FIG. 2A is a view showing a crossroad intersection.

(B1) Situation where the own vehicle 10*a* stops in order to turn right at the crossroad intersection 101 and there is an oncoming vehicle 12*a* which will arrive at the crossroad intersection 101 within a predetermined time (in general, a sufficient time that a vehicle can complete a right turning at the crossroad intersection 101) from the present time (see FIG. 2A).

(B2) Situation where there is at least one of the pedestrian/pedestrians 13*a* and the bicycle/bicycles 13*b* around the route of the traveling of the own vehicle 10*a* when the own vehicle 10*a* turns right at the crossroad intersection 101 (see FIG. 2A).

(B3) Situation where there is at least one of a pedestrian/pedestrians 13*c* and a bicycle/bicycles 13*d* around a route of the traveling of the own vehicle 10*a* when the own vehicle 10*a* turns left at the crossroad intersection 101 (see FIG. 2A).

(B4) Situation where a traffic light 101*a* for regulating the traveling of the own vehicle 10*c* is installed at the crossroad intersection 101, at which the own vehicle 10*c* will arrive in a short time (e.g., in a predetermined time) (see FIG. 2A), and it is predicted that the traffic signal 101*a* lights the red signal when the own vehicle 10*c* arrives at a stop line 101*as* provided corresponding to the traffic signal 101*a* for regulating a position where the own vehicle 10*c* should stop. A timing that the own vehicle 10*c* arrives at the stop line 101 as is estimated on the basis of the present time, a distance to the stop line 100*as* calculated on the basis of a position of the stop line 101*as* and the own vehicle position Pj, the own vehicle speed SPDj and the like.

Figure 2B:
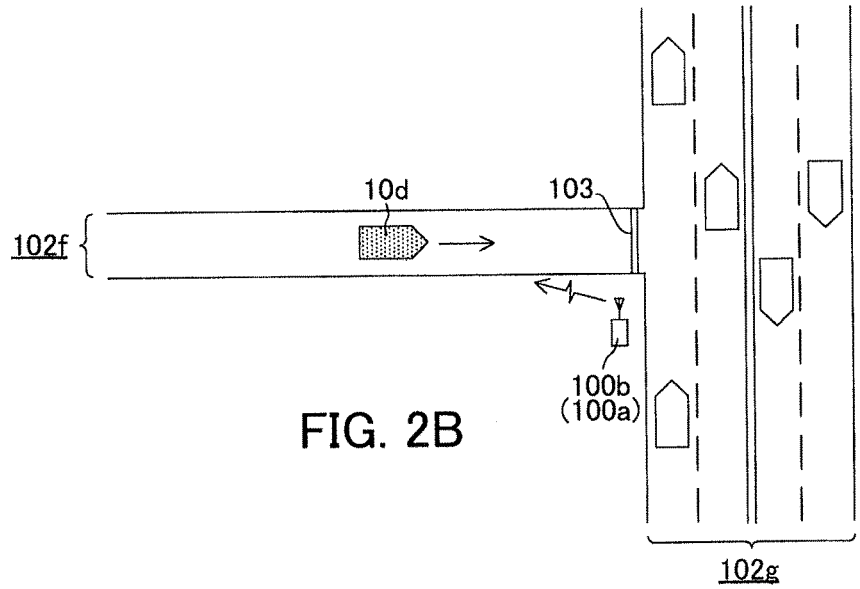
FIG. 2B is a view showing a T-shaped intersection.

(B5) Situation where a time T1 required for the own vehicle 10*d* to arrive at the momentary stop line 103, at which the own vehicle 10*d* will arrive in a short time (i.e., in a predetermined time), is equal to or smaller than a threshold time T1th (see FIG. 2B). The time T1 is estimated on the basis of a distance to the momentary stop line 103 calculated on the basis of the own vehicle position Pj and a position of the momentary stop line 103, the own vehicle speed SPDj and the like.

(B6) Situation where there is/are the other vehicle/vehicles 12*c* and 12*d* stopping in a traveling lane 102*c* along which the own vehicle 10*c* travels and a time T2 required for the own vehicle 10*c* to reach the rearmost vehicle 12*c* is equal to or smaller than a threshold time T2th (see FIG. 2A). The time T2 is estimated on the basis of a distance to the vehicle 12c calculated on the basis of the own vehicle position Pj and a position of the vehicle 12c, the own vehicle speed SPDj and the like.

(B7) Situation where the own vehicle 10c travels along a priority road 102c, there is the T-shaped intersection 102, at which the own vehicle 10c will arrive in a short time (i.e., in a predetermined time), and there is a vehicle 12e which may travel into the T-shaped intersection 102 from a non-priority road (i.e., a side road) 102e when the own vehicle 10c arrives at the T-shaped intersection 102 (see FIG. 2A). The timing that the own vehicle 10c arrives at the T-shaped intersection 102 is estimated on the basis of the present time, a distance to the T-shaped intersection 102 calculated on the basis of the own vehicle position Pj and a position of the T-shaped intersection 102, the own vehicle speed SPDj and the like.

The embodiment control apparatus determines the situations B1 to B3 as first particular situations where the driver of the own vehicle 10 should be alerted, respectively. In particular, each of the first particular situations is a situation regarding a vehicle traveling where the driver of the own vehicle 10 should be alerted and the own vehicle 10 should continue to be stopped. In other words, each of the first particular situations is a situation where the operation of the brake pedal 44 is required for continuing to stop the own vehicle 10 and therefore, is a situation where a degree of a requirement of alerting the driver is relatively high.

On the other hand, the embodiment control apparatus determines the situations B4 to B7 as second particular situations where the driver should be alerted, respectively. Each of the second particular situations is a situation regarding the vehicle traveling where the driver of the own vehicle 10 should be alerted and the own vehicle 10 is permitted to travel. In other words, each of the second particular situations is a situation where the operation of the brake pedal 44 for stopping the own vehicle 10 is not requested and the operation of the acceleration pedal 33 and/or the operation of the brake pedal 44 for decelerating the own vehicle 10 is requested and therefore, the degree of the requirement of alerting the driver is relatively low.

When the embodiment control apparatus determines that at least one of the particular situations B1 to B7 occurs, the embodiment control apparatus provides the driver with information depending on the occurring particular situation(s), using the display 25 and the speaker 26. That is, the embodiment control apparatus executes the particular situation informing control to inform the driver of predetermined information depending on each of the occurring particular situations (and a driving operation recommended depending on necessity).

<BOS Control>

There is known a brake override system (BOS) for executing a braking preference control for ignoring the operation of the acceleration pedal 33 and applying braking forces depending on the operation of the brake pedal 44 to each of the vehicle wheels when both of the brake pedal 44 and the acceleration pedal 33 are operated simultaneously.

This system is configured to perform a simultaneous operation informing for causing the driver to recognize a simultaneous operation of both of the brake pedal 44 and the acceleration pedal 33 and/or a simultaneous operation informing for prompting the driver to release and then operate the brake pedal 44 during a performance of a braking preference control. Hereinafter, the braking preference control will be also referred to as "the BOS control".

Thus, when the simultaneous operation informing is performed, the driver may release the brake pedal 44 and then, operate the brake pedal 44. In this case, although the brake pedal 44 is released, the acceleration pedal 33 may be operated. For example, if the brake pedal 44 is released in response to the simultaneous operation informing and the acceleration pedal 33 is operated when the own vehicle stops at a center area of the traffic intersection in order to turn right and the oncoming vehicle which may block the right-turning of the own vehicle approaches the traffic intersection, that is, when the first particular situation B1 occurs, the own vehicle travels forward.

Accordingly, when the own vehicle stops at the central area of the traffic intersection in order to turn right, the first particular situation where the oncoming vehicle approaches the traffic intersection occurs and the simultaneous operation situation where both of the brake pedal 44 and the acceleration pedal 33 are operated occurs simultaneously, the embodiment control apparatus performs a first particular situation informing for informing the driver of the occurrence of the first particular situation without performing the simultaneous operation informing for informing the driver of the occurrence of the simultaneous operation situation.

On the other hand, when the second particular situation where, for example, the own vehicle 10d approaches the momentary stop line 103 and the simultaneous operation situation occur simultaneously, the embodiment control apparatus performs only the simultaneous operation information for informing the driver of the occurrence of the simultaneous operation situation without performing the second particular situation informing for informing the driver of the occurrence of the second particular situation.

Next, the first and second particular situation informings and the simultaneous operation informing performed by the embodiment control apparatus will be described with reference to the FIGS. 3A, 3B, 4A and 4B. In the example shown in the FIGS. 3A and 3B, no second particular situation occurs. In the example shown in the FIGS. 4A and 4B, no first particular situation occurs.

Figure 3A:
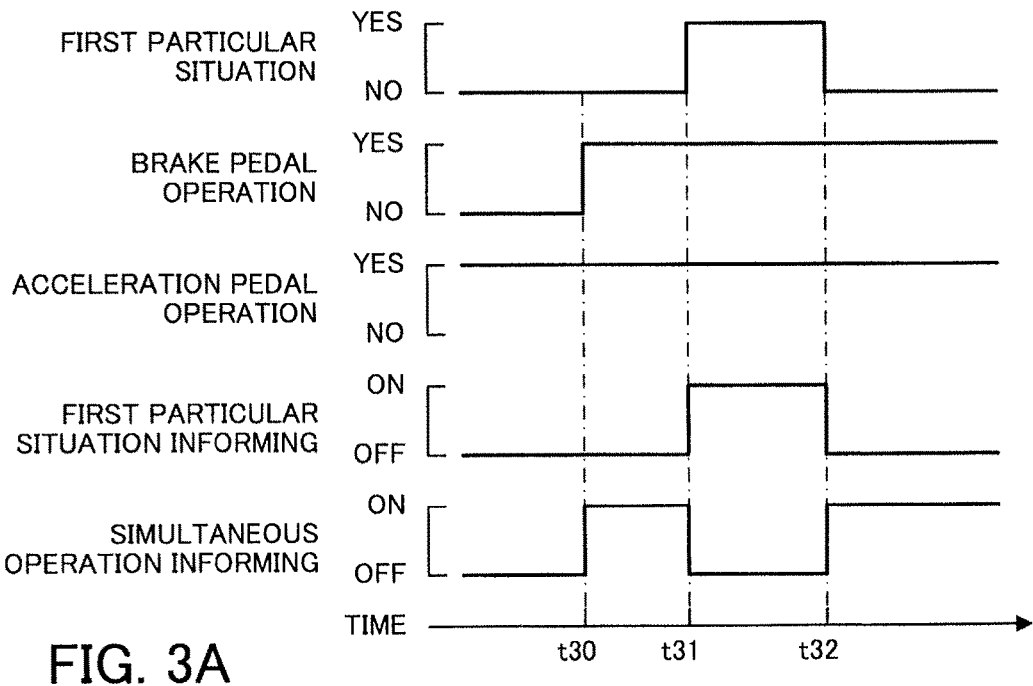
FIG. 3A is a view showing a time chart used for describing an informing control executed by the embodiment apparatus.

In the example shown in FIG. 3A, the simultaneous operation situation occurs at a time t30 since the brake pedal 44 is started to be operated while the acceleration pedal 33 has been operated. At this time, no first particular situation occurs and thus, the embodiment control apparatus starts to perform the simultaneous operation informing (i.e., a BOS informing).

Then, the first particular situation occurs at a time t31. Therefore, the embodiment control apparatus stops the simultaneous operation informing and starts the first particular situation informing for informing the driver of the occurrence of the first particular situation. Then, when the first particular situation disappears at a time t32, the simultaneous operation situation occurs and thus, the embodiment control apparatus stops the first particular situation informing and restarts the simultaneous operation informing.

Figure 3B:
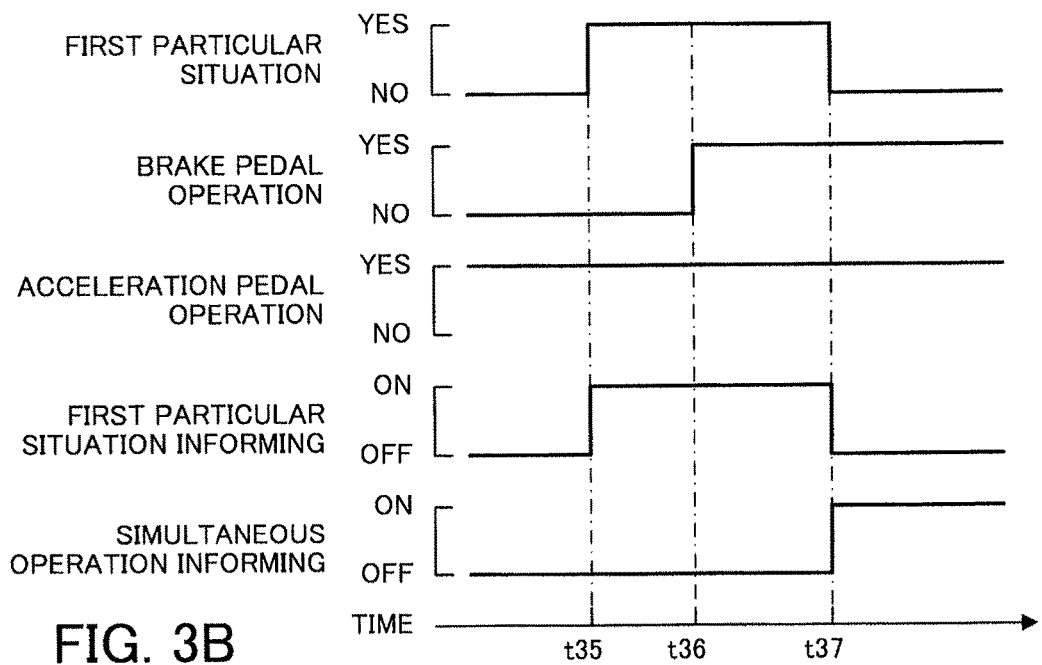
FIG. 3B is a view showing a time chart used for describing an informing control executed by the embodiment apparatus.

In the example shown in FIG. 3B, the first particular situation occurs at a time t35. At this time, no simultaneous operation situation occurs and thus, the embodiment control apparatus starts the first particular situation informing for informing the driver of the occurrence of the first particular situation. Then, the simultaneous operation situation occurs at a time t36, however, the first particular situation continues to occur. Thus, the embodiment control apparatus continues the first particular situation informing. Then, the first particular situation disappears at a time t37. At this time, the simultaneous operation situation occurs and thus, the embodiment control apparatus starts the simultaneous operation informing.

Figure 4A:
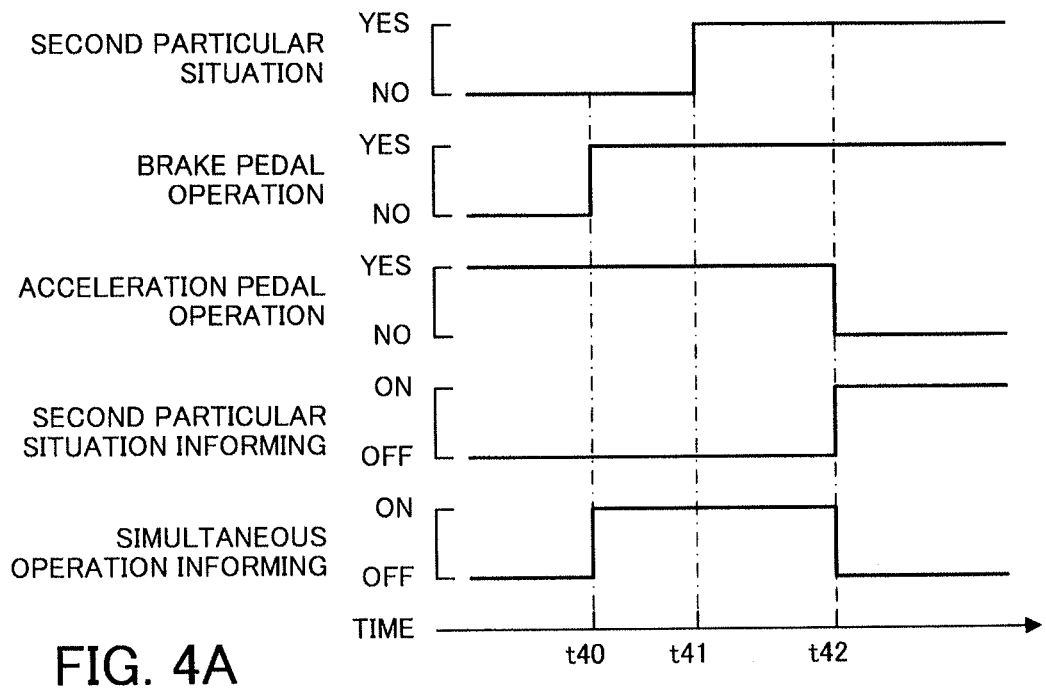
FIG. 4A is a view showing a time chart used for describing an informing control executed by the embodiment apparatus.

In the example shown in FIG. 4A, at a time t40, the brake pedal 44 is operated while the acceleration pedal 33 has been operated and thus, the simultaneous operation situation occurs. At this time, the embodiment control apparatus starts the simultaneous operation informing.

Then, the second particular situation occurs at a time t41. However, at this time, the simultaneous operation situation occurs and thus, embodiment control apparatus continues the simultaneous operation informing. Then, when the simultaneous operation situation disappears at a time t42, the second particular situation occurs and thus, the embodiment control apparatus stops the simultaneous operation informing and starts the second particular situation informing for informing the driver of the occurrence of the second particular situation.

Figure 4B:
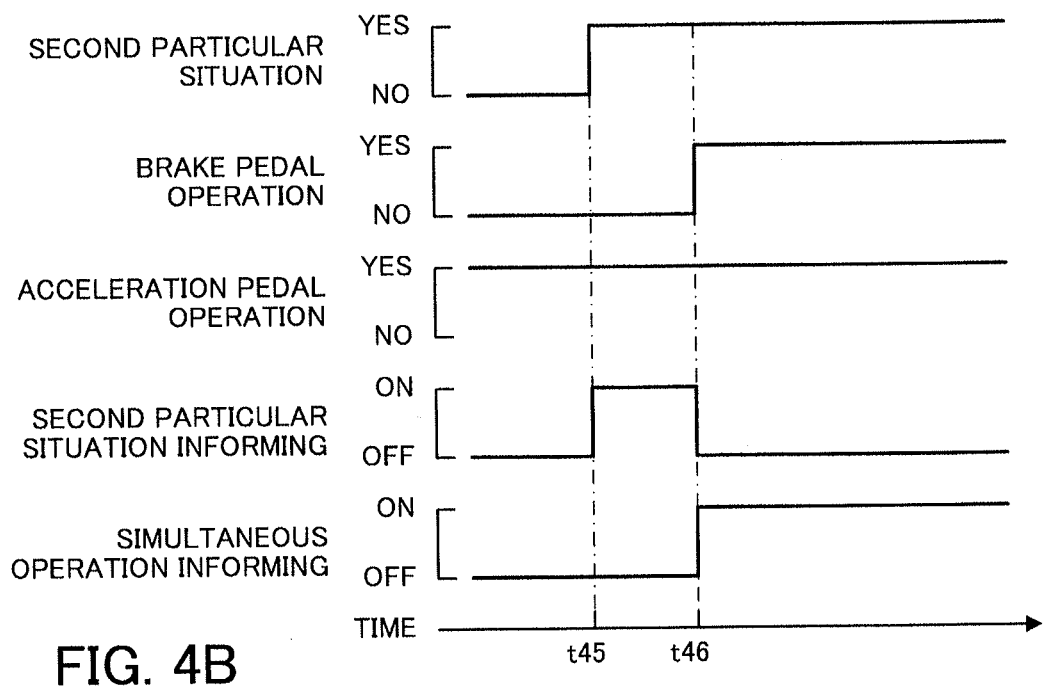
FIG. 4B is a view showing a time chart used for describing an informing control executed by the embodiment apparatus.

In the example shown in FIG. 4B, the second particular situation occurs at a time t45. At this time, no simultaneous operation situation occurs and thus, the embodiment control apparatus starts the second particular situation informing for informing the driver of the occurrence of the second particular situation. Then, the simultaneous operation situation occurs at a time t46. At this time, the embodiment control apparatus stops the second particular situation informing and starts the simultaneous operation informing.

According to the aforementioned first and second particular situation informings and the aforementioned simultaneous operation informing performed by the embodiment control apparatus, the simultaneous operation informing is performed in preference to the second particular situation informing and the first particular situation informing is performed in preference to the simultaneous operation informing. Therefore, in particular, when the continuation of the stop of the own vehicle 10 is required, that is, when the continuation of the operation of the brake pedal 44 is required (i.e., the first particular situation occurs), it is possible to inform the driver of the occurrence of the first particular situation while preventing the own vehicle 10 from moving forward due to the simultaneous operation situation informing.

<Concrete Activation of Embodiment Control Apparatus>

Next, a concrete activation of the embodiment control apparatus will be described. The CPU of the vehicle control ECU 20 of the embodiment control apparatus is configured or programmed to start a routine shown by a flowchart in FIG. 5 each time a predetermined time elapses. Hereinafter, the CPU of the vehicle control ECU 20 will be simply referred to as "the CPU".

Figure 5:
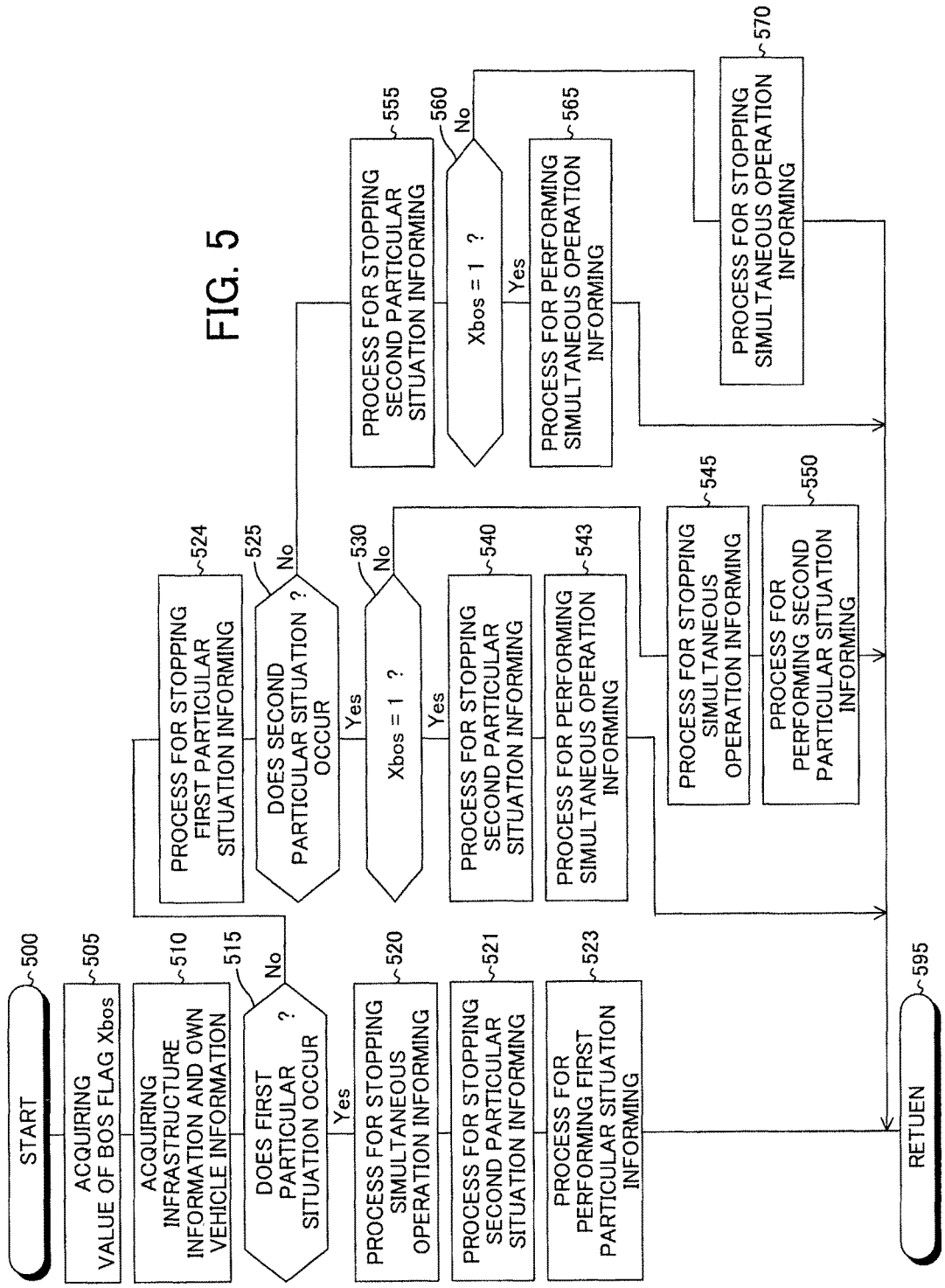
FIG. 5 is a view showing a flowchart of a routine executed by a CPU of a vehicle control ECU shown in FIG. 1.

At a predetermined timing, the CPU starts a process from a step 500 of FIG. 5 and then, sequentially executes processes of steps 505 and 510 described below. Then, the CPU proceeds with the process to a step 515.

Step 505: The CPU acquires a value of a BOS flag Xbos.

Step 510: The CPU acquires the infrastructure information and the own vehicle information from the GPS device 70, the wireless communication control ECU 80 and the navigation ECU 90.

When the CPU proceeds with the process to the step 515, the CPU determines whether or not the first particular situation (for example, a situation where the oncoming vehicle/vehicles approaches/approach the traffic intersection when the own vehicle stops at the center area of the traffic intersection in order to turn right) occurs, that is, a first particular situation informing condition is satisfied on the basis of the infrastructure information and the own vehicle information. In this embodiment, the first particular situation is a situation where the release of the brake pedal 44 derived from the driver's response to the simultaneous operation informing should be prevented.

When the first particular situation occurs upon the execution of the process of the step 515, the CPU determines "Yes" at the step 515 and then, sequentially executes processes of steps 520 and 523 described below. Then, the CPU proceeds with the process to a step 595 to terminate the execution of this routine once.

Step 520: The CPU executes a process for stopping the simultaneous operation informing when the simultaneous operation informing is performed.

Step 521: The CPU executes a process for stopping the second particular situation informing when the second particular situation informing for informing the driver of information depending on the second particular situation is performed.

Step 523: The CPU executes a process for causing the display 25 and the speaker 26 to perform the first particular situation informing for informing the driver of information depending on the first particular situation.

In this case, when a simultaneous operation informing condition is not satisfied and only the first particular situation informing condition is satisfied as well as when both of the simultaneous operation informing condition and the first particular situation informing condition are satisfied simultaneously, the simultaneous operation informing is not performed and the first particular situation informing for informing the driver of information depending on the first particular situation is performed.

On the other hand, when the first particular situation does not occur upon the execution of the process of the step 515, the CPU determines "No" at the step 515 and then, proceeds with the process to a step 524 to stop the first particular situation informing when the first particular situation informing is performed.

Next, the CPU proceeds with the process to a step 525 to determine whether or not the second particular situation (for example, a situation where the other vehicle 12c may move from a side road 102e into the T-shape intersection 102 where the own vehicle 10 approaches) occurs on the basis of the infrastructure information and the own vehicle information acquired at the step 510. In this embodiment, the second particular situation is a situation where a degree of a requirement of preventing the driver from releasing the brake pedal 44 in response to the simultaneous operation informing is smaller than the degree of the requirement in the first particular situation.

When the second particular situation occurs upon the execution of the process of the step 525, the CPU determines "Yes" at the step 525 and then, proceeds with the process to a step 530 to determine whether or not the value of the BOS flag Xbos acquired at the step 505 is "1", that is, whether or not the simultaneous operation informing condition is satisfied.

When the value of the BOS flag Xbos is "1", the CPU determines "Yes" at the step 530 and then, sequentially executes processes of steps 540 and 543 described below. Then, the CPU proceeds with the process to the step 595 to terminate the execution of this routine once.

Step 540: The CPU executes a process for stopping the second particular situation informing when the second particular situation informing of the driver of information depending on the second particular situation is performed.

Step 543: The CPU executes a process for performing the simultaneous operation informing.

On the other hand, when the value of the BOS flag Xbos is "0" upon the execution of the process of the step 530, the CPU determines "No" at the step 530 and then, sequentially executes processes of steps 545 and 550 described below. Then, the CPU proceeds with the process to the step 595 to terminate the execution of this routine once.

Step 545: The CPU executes a process for stopping the simultaneous operation informing when the simultaneous operation informing is performed.

Step 550: The CPU executes a process for performing the second particular situation informing for informing the driver of information depending on the second particular situation.

When the second particular situation does not occur upon the execution of the process of the step 525, the CPU determines "No" at the step 525 and then, proceeds with the process to a step 555 to execute a process for stopping the second particular situation informing when the second particular situation informing is performed. Then, the CPU proceeds with the process to a step 560.

When the CPU proceeds with the process to the step 560, the CPU determines whether or not the value of the BOS flag Xbos is "1". When the value of the BOS flag Xbos is "1", the CPU determines "Yes" at the step 560 and then, proceeds with the process to a step 565 to execute a process for performing the simultaneous operation informing. Then, the CPU proceeds with the process to the step 595 to terminate the execution of this routine once.

On the other hand, when the value of the BOS flag Xbos is "0" upon the execution of the process of the step 560, the CPU determines "No" at the step 560 and proceeds with the process to a step 570 to execute a process for stopping the simultaneous operation informing when the simultaneous operation informing is performed. Then, the CPU proceeds with the process to the step 595 to terminate the execution of this routine once.

Figure 6:
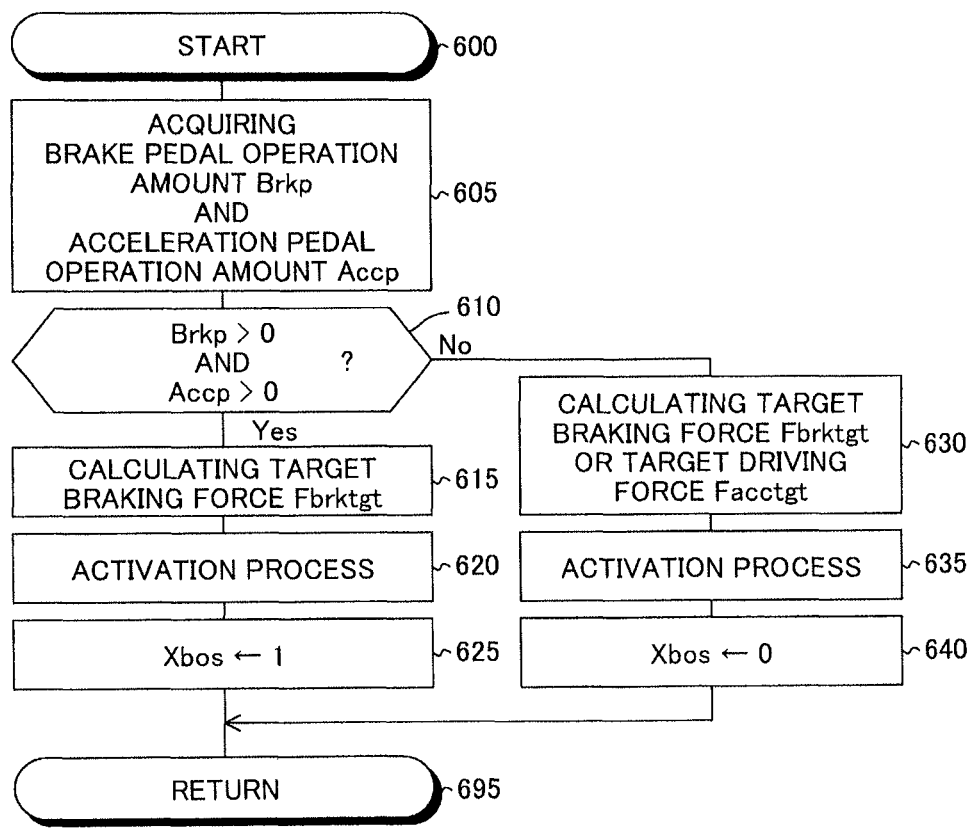
FIG. 6 is a view showing a flowchart of a routine executed by the CPU.

Further, the CPU is configured or programmed to execute a routine shown by a flowchart in FIG. 6 each time a predetermined time elapses. Therefore, at a predetermined timing, the CPU starts an execution of a process from a step 600 of FIG. 6 and proceeds with the process to a step 605 to acquire the brake pedal operation amount Brkp from the brake control ECU 40 and acquire the acceleration pedal operation amount Accp from the engine control ECU 30.

Next, the CPU proceeds with the process to a step 610 to determine whether or not the brake pedal operation amount Brkp and the acceleration pedal operation amount Accp acquired at the step 605 are larger than zero. When the brake pedal operation amount Brkp and the acceleration pedal operation amount Accp are larger than zero, the CPU determines "Yes" at the step 610 and then, sequentially executes processes of steps 615 to 625 described below. Then, the CPU proceeds with the process to a step 695 to terminate the execution of this routine once.

Step 615: The CPU calculates a target value Fbrktgt of the braking force (i.e., a target braking force) to be applied to each vehicle wheel of the own vehicle 10 on the basis of the brake pedal operation amount Brkp acquired at the step 605. In particular, the CPU does not calculate a target value Facctgt of the driving force (i.e., a target driving force) to be applied to each vehicle wheel of the own vehicle 10 on the basis of the acceleration pedal operation amount Accp acquired at the step 605 or sets the target driving force Facctgt to zero. Therefore, the BOS control is executed.

Step 620: The CPU executes a process for activating the brake actuator 43 such that the braking force corresponding to the target braking force Fbrktgt calculated at the step 615 is applied to each vehicle wheel.

Step 625: The CPU sets the value of the BOS flag Xbos to "1". The value of the flag Xbos is set to "1" when an execution of the BOS control is started. On the other hand, the value of the flag Xbos is set to "0" when the execution of the BOS control is terminated.

When any one of the brake pedal operation amount Brkp and the acceleration pedal operation amount Accp is zero upon the execution of the process of the step 610, the CPU determines "No" at the step 610 and then, sequentially executes processes of steps 630 to 640 described below. Then, the CPU proceeds with the process to the step 695 to terminate the execution of this routine once.

Step 630: The CPU calculates the target value Fbrktgt of the braking force (i.e., the target braking force) to be applied to each vehicle wheel on the basis of the brake pedal operation amount Brkp when the brake pedal operation amount Brkp acquired at the step 605 is larger than zero. On the other hand, the CPU calculates the target value Facctgt of the driving force (i.e., the target driving force) to be applied to each vehicle wheel on the basis of the acceleration pedal operation amount Accp when the acceleration pedal operation amount Accp acquired at the step 605 is larger than zero.

Step 635: The CPU executes a process for activating the brake actuator 43 such that the braking force corresponding to the target braking force Fbrktgt is applied to each vehicle wheel when the CPU has calculated the target braking force Fbrktgt at the step 615. On the other hand, the CPU executes a process for activating the engine actuators 32 such that the driving force corresponding to the target driving force Facctgt is applied to each of driving wheels of the own vehicle 10 when the CPU has calculated the target driving force Facctgt at the step 615.

Step 640: The CPU sets the value of the BOS flag Xbos to "0".

The concrete operation of the embodiment control apparatus has been described. According to the embodiment control apparatus, when it is not preferred that the own vehicle 10 travels forward (see the determination of "Yes" at the step 515 of FIG. 5), no simultaneous operation informing is performed (see the step 520) and the first particular situation informing for providing the driver with the information regarding the first particular situation is performed (see the step 523). Thus, the own vehicle 10 can be prevented from traveling forward when the own vehicle 10 should continue to be stopped and the driver of the own vehicle 10 can be provided with the information regarding the first particular situation.

The present invention is not limited to the aforementioned embodiment and various modifications can be employed within a scope of the present invention.

The embodiment control apparatus is configured to realize the simultaneous operation informing, the first particular situation informing and the second particular situation informing by performing a graphic display on the display 25 and the sound generation by the speaker 26. Alternatively, the embodiment control apparatus may be configured to realize the informings by displaying the graphic display or generating the sound or by a method other than the graphic display and the sound generation.

What is claimed is:

1. A vehicle control apparatus for use with a vehicle, the vehicle control apparatus comprising:
   a road situation information acquisition device configured to acquire road situation information on a road situation present outside of the vehicle via wireless communication; and an electronic control unit configured to:
- determine an occurrence of a first collision situation in which a driver of a traveling vehicle should be alerted and the vehicle should continue to be stopped based on the acquired road situation information;
- determine an occurrence of a simultaneous pedal operation situation in which both of an acceleration pedal and a brake pedal of the vehicle are simultaneously operated;
- in response to the occurrence of the first collision situation, perform a first collision situation process for providing information to the driver depending on the collision situation; and
- in response to the occurrence of the simultaneous pedal operation situation, perform a simultaneous pedal operation process for providing information to the driver depending on the simultaneous pedal operation situation, wherein:

in response to the first collision situation and the simultaneous pedal operation situation occurring simultaneously, the electronic control unit only performs the first collision situation process.

2. The vehicle control apparatus according to claim 1, wherein the electronic control unit is further configured to:
- determine whether or not a second collision or stopping situation regarding the vehicle traveling where the driver of the vehicle should be alerted and the vehicle is permitted to travel on the basis of the acquired road situation information,
- perform a second collision or stopping situation process for providing information depending on the second collision or stopping situation when the electronic control unit determines that: (i) the first collision situation and the simultaneous pedal operation situation do not occur, and (ii) the second collision or stopping situation occurs, and
- perform the simultaneous pedal operation process without performing the second collision or stopping situation process when the electronic control unit determines that: (a) the first collision situation does not occur, and (b) the second collision situation and the simultaneous pedal operation situation occur.

3. The vehicle control apparatus according to claim 1, wherein the first collision situation is a state in which the vehicle is traveling where the driver of the vehicle should be alerted and the vehicle should continue to be stopped when the vehicle is positioned in a traffic intersection.

4. The vehicle control apparatus according to claim 2, wherein the second collision or stopping situation is a state in which the vehicle is traveling towards a stop line or intersection in a short period of time.

* * * * *